Figure 1:
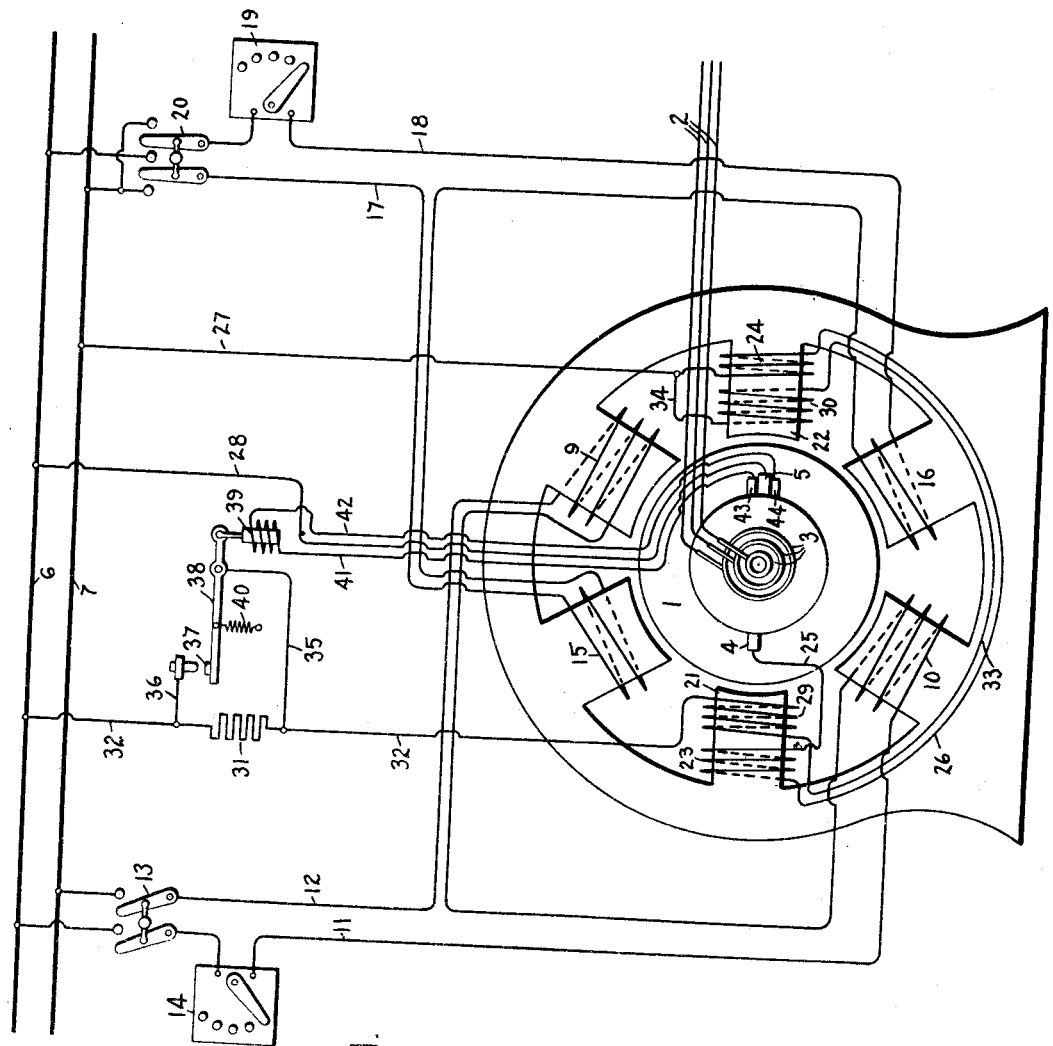

J. L. BURNHAM.
DYNAMO ELECTRIC MACHINE.
APPLICATION FILED OCT. 26, 1910.

1,055,873.

Patented Mar. 11, 1913.
2 SHEETS—SHEET 1.

WITNESSES:
J. Earl Ryan
J. Ellie Eler

INVENTOR:
JOSEPH L. BURNHAM
BY Albert H. Davis
HIS ATTORNEY.

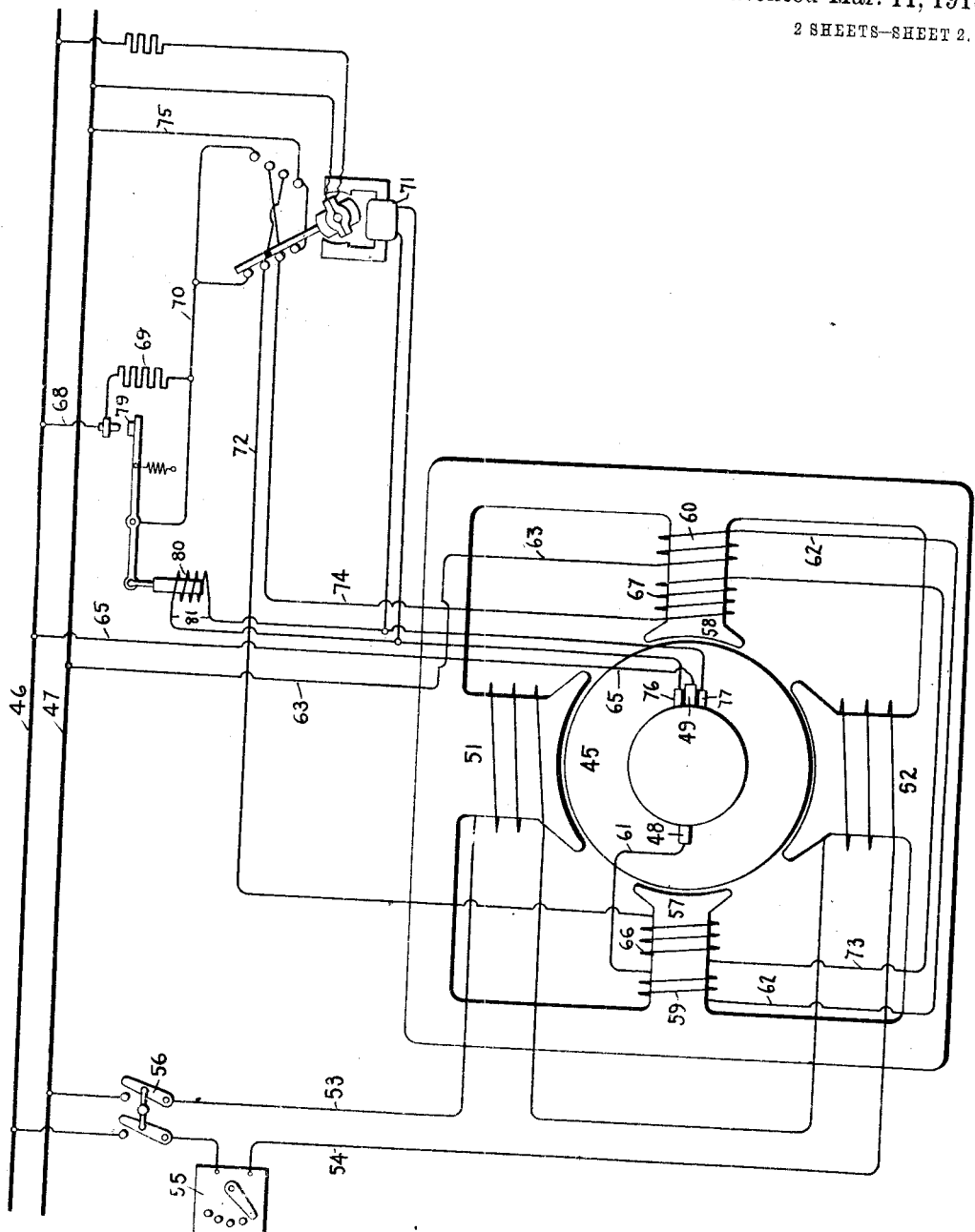

UNITED STATES PATENT OFFICE.

JOSEPH L. BURNHAM, OF SCHENECTADY, NEW YORK, ASSIGNOR TO GENERAL ELECTRIC COMPANY, A CORPORATION OF NEW YORK.

DYNAMO-ELECTRIC MACHINE.

1,055,873.  Specification of Letters Patent.  Patented Mar. 11, 1913.

Application filed October 26, 1910. Serial No. 589,219.

*To all whom it may concern:*

Be it known that I, JOSEPH L. BURNHAM, a citizen of the United States, residing at Schenectady, in the county of Schenectady, State of New York, have invented certain new and useful Improvements in Dynamo-Electric Machines, of which the following is a specification.

My invention relates to dynamo-electric machines, and particularly to such machines provided with anti-sparking windings.

The object of my invention is to arrange the anti-sparking windings so that they will always be of the proper strength to produce proper commutation.

In a variable ratio rotary converter, such as that shown in my application, Ser. No. 423,833, filed March 28, 1908, the distribution of flux at times varies because of the variation of the magnetization of the regulating pole. Under these conditions the anti-sparking windings when connected in series with the armature winding as has been done heretofore, do not always produce a flux which will produce proper commutation. In other words, the distribution of the flux may vary while the armature current remains constant and, therefore, does not produce a corresponding corrective change in the anti-sparking windings or in the flux produced by them. Also in all dynamo-electric machines provided with commutating poles the proportionality between the variations in the armature current and the magnetic flux under the commutating pole is likewise disturbed as the load is increased due to the fact that the magnetization of the commutating pole is at or past the knee in the saturation curve. With increasing load it is, therefore, desirable to have the current in the commutating windings vary more rapidly than the variations in armature current.

In accordance with my invention the effective magnetization due to the anti-sparking windings is varied in accordance with the variations of differences of voltage from heel to toe of the brushes. As soon as a difference of voltage greater than some predetermined negligible value tends to establish itself across the brushes, this difference of voltage acts on a corrective device which readjusts the excitation of the anti-sparking windings. As will be more fully explained in connection with the accompanying drawings, I provide anti-sparking windings and control the current in said windings by a device responsive to a difference of potential between the heel and toe of the brushes.

In the drawings, Figure 1 shows diagrammatically a regulating pole, or variable ratio rotary converter, and Fig. 2 shows an ordinary commutating pole machine both being provided with anti-sparking windings in accordance with my invention.

Referring to Fig. 1, the armature 1 of the rotary takes current from alternating current supply lines 2 connected thereto by means of slip rings 3 in the usual manner. On the direct current side of the machine the main brushes 4, 5 are connected, as will be presently explained, to the direct current supply lines 6, 7. The windings 9, 10 on the main poles are connected in series by means of conductors 11, 12, across the lines 6, 7 through a switch 13 and in series with an adjustable rheostat 14. The regulating poles have their windings, 15, 16 connected in series across lines 6, 7 by means of conductors 17, 18 in which is included an adjustable rheostat 19 and a reversing switch 20. The commutating poles 21, 22 are each provided with a series winding 23, 24, respectively, the circuit being traced from brush 4 to conductor 25, winding 23, conductor 26, winding 24, conductor 27, which is connected to line 7, the circuit being completed from line 6 through conductor 28 to brush 5. The series windings are calculated for a maximum excitation corresponding to the minimum ratio of ampere turns to load; that is, the ratio which would be satisfactory provided no disturbances occur and provided the iron of the magnetic circuit did not become saturated as its excitation increased. In order to produce the additional excitation which is necessary to compensate for disturbances resulting from the variations in flux of the regulating poles, or the saturation of the iron, the commutating poles are provided with auxiliary anti-sparking windings 29, 30, connected in shunt across the lines 6, 7 in series with a resistance 31. The circuit is completed through conductor 32 connected to line 6, winding 29, conductor 33, winding 30, conductor 34 and conductor 27 which is connected to line 7. The resistance 31 is shunted by conductors 35, 36 in the circuit of which is included a vibrating contact 37. This vibrating contact is controlled by switch 38 which is connected by a magnet 39 working against a spring 40 in a manner which is well understood in connection with the operation of the Tirrill regulator, which I have shown diagrammatically. The winding of the magnet 39 is connected by means of conductors 41, 42 to auxiliary brushes 43, 44, located on either side of the main brush 5 and preferably insulated therefrom as indicated in the drawing. These auxiliary brushes may be placed at some slight distance from the main brush.

The operation of the system just described is as follows: When the voltage from heel to toe of the brushes does not exceed a certain predetermined value, the contact 37 remains open. This predetermined value of voltage may be as much as one volt without causing sparking. If anything occurs to cause the commutating field to vary in such a manner as to increase this voltage, as for example, by varying or reversing the excitation of the regulating poles 15, 16 in order to vary the ratio between the direct and alternating currents, or by the magnetic circuit becoming saturated, a current will circulate through the winding 39 which is great enough to close contact 37, thereby short-circuiting the resistance 31 because of the increased difference of potential between the auxiliary brushes 43, 44. The current flowing through the windings 29, 30, will increase and as the windings 29, 30 are so wound as to assist the series winding 23, 24, the resultant commutating field will increase until the difference of potential from heel to toe of the main direct current brushes, or in other words, the difference of potential between the auxiliary or exploring brushes has been reduced, thereby weakening the pull of the magnet 39 until the contact 37 is opened by the pull of the spring 40. As the voltage again tends to rise, this cycle of operation will be repeated, the vibration taking place at a high rate of speed and the relative lengths of time that the resistance 31 is inserted or withdrawn depending upon the value of the potential which under the conditions tends to establish itself from heel to toe across the direct current brushes. The rapid insertion and withdrawal of the resistance 31 in the circuit of windings 29, 30 maintains the excitation of these windings at a value necessary to produce a proper commutating field and prevent sparking at the brushes.

Fig. 2 illustrates diagrammatically an ordinary commutating pole machine having its armature 45 connected across lines 46, 47, by means of brushes 48, 49, the circuit connections being traced hereinafter. The windings 51, 52, on the main poles are connected in series by means of conductors 53, 54, across lines 46, 47 the circuit including an adjustable rheostat 55 and a switch 56. The commutating poles 57, 58 are provided with anti-sparking windings 59, 60, respectively, these windings being connected in series with the brushes, the circuit being completed from brush 48 through conductor 61, winding 59, conductor 62, winding 60, conductor 63, which is connected to line 47, the circuit being completed from line 46 through conductor 65 which returns to the brush 49. As in Fig. 1, the series windings on the commutating poles may be calculated to give a maximum excitation corresponding to the minimum ratio of ampere turns to load, but instead of calculating the series windings for the minimum ratio of ampere turns to load, in the arrangement shown in this figure they are calculated for a greater number of ampere turns than this. In this case, it will be necessary to reverse as well as to regulate the strength of the current flowing through the auxiliary windings 66, 67 on the commutating poles in order to produce the proper commutating field for varying loads on the machine. The auxiliary anti-sparking windings 66, 67 are connected across the lines 46, 47, the circuit being completed through conductors 68, resistance 69, conductor 70, the contacts of a reversing switch controlled by the polarized relay 71, conductor 72, winding 66, conductor 73, winding 67, conductor 74, a second set of contacts of the reversing switch and conductor 75. As already explained in connection with Fig. 1 the auxiliary brushes 76, 77 are preferably insulated from the main brush. They are connected to the winding of magnet 80 by means of conductors 81. The magnet 78 controls a vibrating contact 79 which periodically short-circuits the resistance 69 in the manner already explained. The short-circuiting device is shown diagrammatically and is preferably a Tirrill regulator.

The operation of the apparatus just described is similar to that already described in connection with Fig. 1. If the magnetic circuit becomes saturated at high load values, the reversing switch takes the position shown in the drawings, the auxiliary anti-sparking windings assisting the series windings, and the contact 79 will vibrate at a high rate of speed to short-circuit the resistance 69, in the circuit of the anti-sparking windings 66, 67, the relative lengths of time that the resistance is inserted or withdrawn, depending upon the value of the voltage which under the conditions tends to establish itself from heel to toe of the direct current brushes. When the load falls below these high values, the voltage across heel and toe of the main brushes will reverse in polarity resulting in a reversal of the polarized relay which is connected across the conductor 81, thereby reversing the connections of the auxiliary windings 66, 67, so that the flux produced by these windings will now oppose the flux produced by the main windings 59, 60, thereby producing a resultant commutating flux of proper value, the contact 79 vibrating as described before to regulate the current flowing through the windings 66, 67 until the load falls so low that the voltage from heel to toe of the brushes does not exceed a certain predetermined value and the contact 79 remains open. Instead of calculating the series anti-sparking windings to give a maximum excitation corresponding to the minimum ratio of ampere turns to load or for a somewhat greater number of turns than this, as explained in connection with Figs. 1 and 2, I may calculate the series anti-sparking windings for the maximum ratio of ampere turns to load, in which case the auxiliary anti-sparking windings will always oppose the series winding. In this case the polarized reversing switch of Fig. 2 is not needed. This combination is particularly desirable with rapidly changing loads as it will establish the required commutating field more quickly.

I do not desire to limit myself to the particular arrangement here shown as changes which do not depart from the spirit of my invention and are within the scope of the appended claims, will be obvious to those skilled in the art. For example, the commutating poles may be provided with shunt windings only, the series windings being entirely dispensed with and the proper excitation of the shunt windings being maintained by the vibrations of the switch controlled by the voltage from heel to toe of the brush, thereby inserting and withdrawing the resistance in series with the shunt windings at proper intervals in order to maintain the anti-sparking field at the proper value.

What I claim as new and desire to secure by Letters Patent of the United States is:

1. In a dynamo electric machine, an armature winding provided with a commutator, brushes on said commutator, anti-sparking windings connected in series with said armature winding, auxiliary anti-sparking windings, and means for varying the excitation of said auxiliary windings in accordance with a difference of voltage from heel to toe of said brushes.

2. In a dynamo electric machine, an armature winding provided with a commutator, brushes for said commutator, anti-sparking windings, auxiliary anti-sparking windings, and means for varying the polarity and effective ampere turns of said auxiliary windings in accordance with a difference in potential from heel to toe of any one of said brushes.

3. In a dynamo electric machine, an armature winding provided with a commutator, brushes carrying the load current of said machine, auxiliary brushes on each side of one of said load brushes and insulated therefrom, anti-sparking windings, and means operative by current flowing between said auxiliary brushes for varying the excitation of said anti-sparking windings.

4. In a dynamo electric machine, an armature winding provided with a commutator, brushes on said commutator, anti-sparking windings connected in series with said brushes, auxiliary anti-sparking windings, a resistance in series with said auxiliary windings, and means responsive to a difference of potential between heel and toe of any one of said brushes to insert and withdraw said resistance in the circuit of said auxiliary windings to vary their excitation.

5. In a dynamo electric machine, an armature winding provided with a commutator, brushes on said commutator, anti-sparking windings, auxiliary anti-sparking windings, means for varying the excitation of said auxiliary windings in accordance with a difference of voltage from heel to toe of one of said brushes, and means for varying the polarity of said auxiliary windings in accordance with the polarity of the voltage from heel to toe of one of said brushes.

6. In a dynamo electric machine, an armature winding provided with a commutator, brushes on said commutator, commutating poles, windings on said poles connected in series with said armature winding, auxiliary windings on said poles and means for varying the excitation of said auxiliary windings in accordance with a difference of potential from heel to toe of said brushes.

7. In a dynamo electric machine, an armature winding provided with a commutator, brushes carrying the load of said machine, auxiliary brushes on each side of one of said main brushes and insulated therefrom, anti-sparking windings connected in series with said armature winding, auxiliary anti-sparking windings, and means operative by current flowing between said auxiliary brushes for varying the excitation of said auxiliary windings.

8. In a dynamo electric machine, an armature winding provided with a commutator, brushes carrying the load current of said machine, auxiliary brushes on each side of one of said main brushes and insulated therefrom, commutating poles, windings on said poles in series with said armature winding, auxiliary windings on said poles and means operative by current flowing between said auxiliary brushes for varying the excitation of said auxiliary windings.

9. In a dynamo electric machine, an armature winding provided with a commutator, brushes on said commutator, anti-sparking windings, a resistance in series with said anti-sparking windings, and means responsive to a difference of potential between the heel and toe of any one of said brushes to insert and withdraw said resistance in the circuit of said anti-sparking windings to vary their excitation.

10. In a dynamo electric machine, an armature winding provided with a commutator, brushes on said commutator, commutating poles, windings on said poles connected in series with said brushes, auxiliary windings on said poles, a resistance in series with said auxiliary windings, and means responsive to a difference of potential between the heel and toe of any one of said brushes to insert and withdraw said resistance in the circuit of said auxiliary windings to vary their excitation.

11. In a dynamo electric machine, an armature winding provided with a commutator, brushes carrying the load current of said machine, auxiliary brushes on each side of one of said main brushes and insulated therefrom, anti-sparking windings, a resistance in series with said anti-sparking windings, and means operative by current flowing between said auxiliary brushes for inserting and withdrawing said resistance in the circuit of said anti-sparking windings to vary their excitation.

12. In a dynamo electric machine, an armature winding provided with a commutator, brushes carrying the load current of said machine, auxiliary brushes on each side of one of said main brushes and insulated therefrom, anti-sparking windings connected in series with said load brushes, auxiliary anti-sparking windings, a resistance in series with said auxiliary windings, and means operative by current flowing between said auxiliary brushes for inserting and withdrawing said resistance in the circuit of said auxiliary windings to vary their excitation.

13. In a dynamo electric machine, an armature winding provided with a commutator, brushes carrying the load current of said machine, auxiliary brushes on each side of one of said main brushes and insulated therefrom, commutating poles, windings on said poles, a resistance in series with said windings on said poles, and means operative by current flowing between said auxiliary brushes for inserting and withdrawing said resistance in the circuit of said windings on said poles to vary their excitation.

14. In a dynamo electric machine, an armature winding provided with a commutator, brushes carrying the load current of said machine, auxiliary brushes on each side of one of said main brushes and insulated therefrom, commutating poles, windings on said poles connected in series with said load brushes, auxiliary windings on said poles, a resistance in series with said auxiliary windings, and means operative by current flowing between said said auxiliary brushes for inserting and withdrawing said resistance in the circuit of said auxiliary windings to vary their excitation.

15. In combination a dynamo electric machine provided with armature coils, commutator and brushes, and having a suitable magnetic circuit for a commutating magnetic flux, a pair of auxiliary brushes bearing on the commutator on opposite sides of one of the main brushes, and means responsive to the voltage across the auxiliary brushes for controlling the commutating flux.

16. In combination, a dynamo-electric machine provided with an armature, commutator and main brushes and with commutating poles, a pair of auxiliary brushes bearing on the commutator on opposite sides of one of the main brushes, and a regulator responsive to the voltage across said auxiliary brushes, and adapted to control the excitation of the commutating poles.

17. In a dynamo electric machine, an armature winding provided with a commutator, brushes carrying the load current of said machine, auxiliary brushes on each side of one of said main brushes, commutating poles, exciting windings on said poles, auxiliary windings on said poles and means operative by current flowing between said auxiliary brushes for varying the excitation of said auxiliary windings.

18. In combination, a dynamo-electric machine provided with an armature, commutator and main brushes and with commutating poles, windings and connections for exciting said commutating poles, a pair of auxiliary brushes bearing on the commutator on opposite sides of one of the main brushes, and a vibratory regulator responsive to the voltage across said auxiliary brushes and adapted to control the current in said windings.

In witness whereof, I have hereunto set my hand this 22nd day of October, 1910.

JOSEPH L. BURNHAM.

Witnesses:
HELEN ORFORD,
BENJAMIN B. HULL.